April 3, 1951 C. A. SCHEIRER 2,547,601
CABLE VISE
Filed Oct. 24, 1947 3 Sheets-Sheet 1
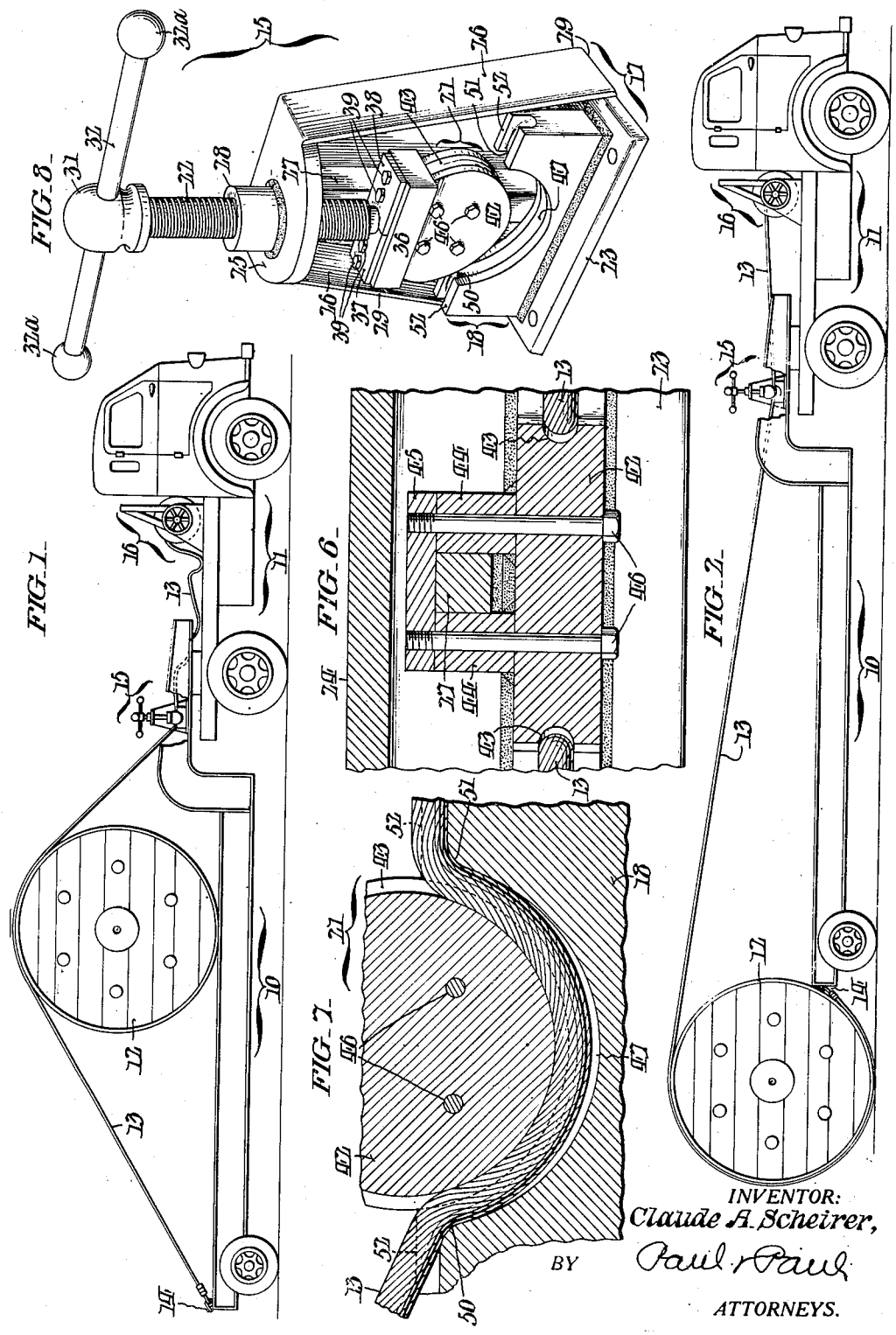
INVENTOR:
Claude A. Scheirer,
BY Paul & Paul
ATTORNEYS.

April 3, 1951
C. A. SCHEIRER
2,547,601
CABLE VISE
Filed Oct. 24, 1947
3 Sheets-Sheet 2
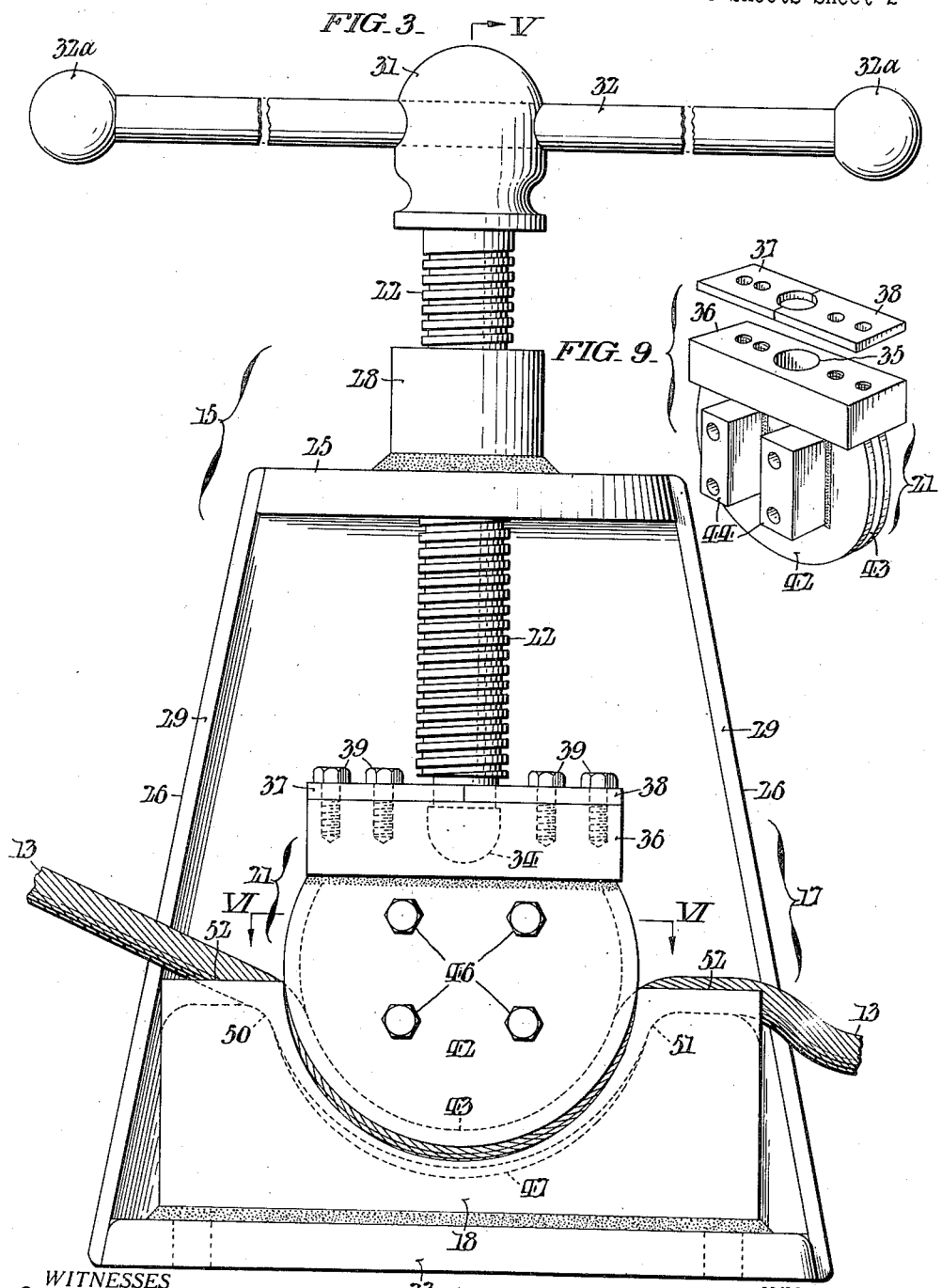
WITNESSES
Thomas W. Kerr, Jr.
A. J. Brittingham
INVENTOR:
Claude A. Scheirer,
BY Paul & Paul
ATTORNEYS.

April 3, 1951 C. A. SCHEIRER 2,547,601
CABLE VISE

Filed Oct. 24, 1947 3 Sheets-Sheet 3

WITNESSES
Thomas W. Kerr, Jr.
A. J. Brittingham

INVENTOR:
Claude A. Scheirer,
BY Paul & Paul
ATTORNEYS.

Patented Apr. 3, 1951

2,547,601

UNITED STATES PATENT OFFICE 2,547,601

CABLE VISE

Claude A. Scheirer, Havertown, Pa.

Application October 24, 1947, Serial No. 781,775

11 Claims. (Cl. 214—85)

This invention relates to a cable vise and more specifically to a cable vise for securing heavy bodies during transportation.

It is now quite usual to load heavy bodies on a trailer drawn by a tractor by means of a cable lead to a winch mounted on the tractor and operated under power from the motor of the tractor. After the load is in place, it then becomes necessary to provide a means for securing it during transportation. The cable used in loading must be released at the winch in order to give the tractor free movement to maneuver. Additional holding down guys could be provided, of course, but this would require more equipment including the devising of means for properly tensioning such holding down guys by utilizing the winch. United States Patent #2,159,848 shows the complications and and complexities involved in providing special holding down equipment for heavy bodies during shipment. The invention described below is directed to the utilization of the existing winch and loading cable and in effect converts the loading cable into a holding down cable during transportation.

It is therefore an object of this invention to provide a means for securing a heavy body on a trailer in a fixed position during transportation by utilizing the loading cable by which the heavy body was loaded onto the trailer.

Another object is the provision of a cable vise for gripping a cable subject to heavy tension and increasing the tension by the gripping action. Another object is the provision of a cable vise which may also function as a fair-lead when not operating in a gripping action. Another object is the provision of a combination loading and holding down means for use with a truck and trailer combination which may be operated quickly and easily without loss of time in the loading and unloading operations.

Still further objects and advantages of this invention will become apparent from the following detailed description of a preferred embodiment thereof, reference being had to the accompanying drawings.

Of the drawings, Fig. 1 is a side view of a trailer and tractor assembly embodying this invention and showing a heavy cable reel held in place for transportation.

Fig. 2 is a view of the trailer and tractor assembly shown in Fig. 1 but showing the cable reel in the process of loading or unloading.

Fig. 3 is a front view of the cable vise constructed according to this invention.

Fig. 6 is a horizontal fragmentary sectional view taken as indicated by the arrows VI—VI in Fig. 5.

Fig. 7 is a vertical fragmentary sectional view taken as indicated by the arrows VII—VII in Fig. 5.

Fig. 8 is a perspective view of the cable vise constructed according to this invention showing the vise in the open position.

Fig. 9 is an exploded perspective view of the upper gripping element of the cable vise showing its component parts.

Figure 4:
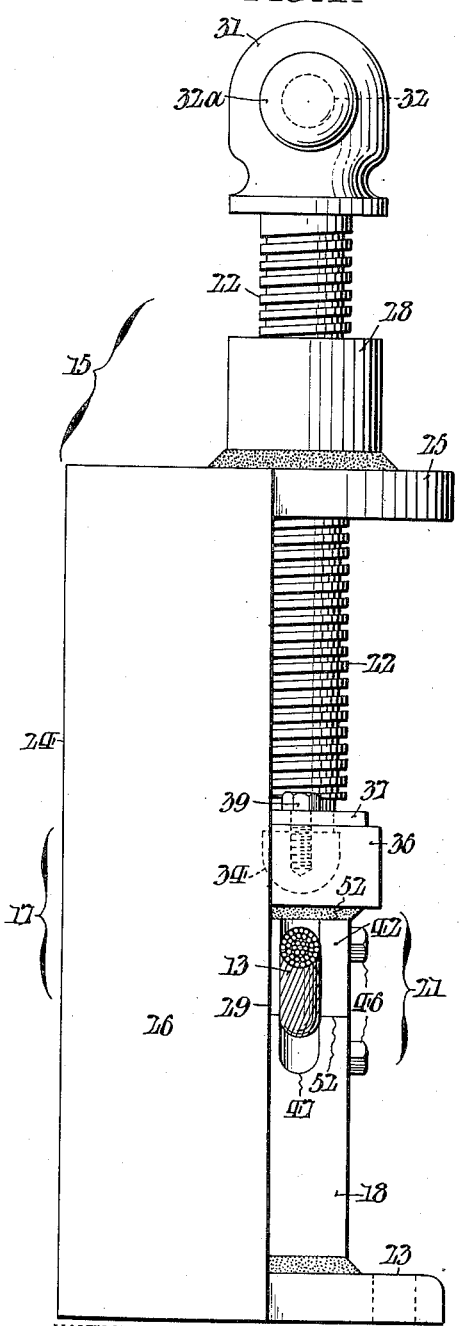
Fig. 4 is an end view of the device shown in Fig. 3.

In describing the embodiments of this invention shown in the drawings, a specific terminology will be adopted for the purpose of clarity, but it is to be understood that it is not intended thereby to limit the invention to this detailed description of an illustrative embodiment thereof. Each term adopted is intended to include all equivalents thereof which operate in a substantially similar manner to accomplish a substantially similar result.

In Fig. 1 there is shown a conventional trailer 10 attached to a conventional tractor 11. A heavy cable reel 12 is held in place on the trailer 10, for transportation by means of a cable 13. One end of the cable 13 is fastened in a conventional manner to the rear end of the trailer 10 at 14, and extends over the reel 12, through cable vise 15, securely mounted on the front portion of the trailer 10, to winch 16 mounted on the tractor 11. The winch 16 is of a conventional type powered by the motor of the tractor 11. The cable vise 15 comprises generally a frame 17, a lower gripping element 18 mounted in the bottom of the frame 17, an upper gripping element 21 mounted on the frame 17 with capacity for vertical sliding movement above the lower gripping element 18, a threaded operating shaft 22 mounted in the top portion of the frame 17 and rotatably connected at its lower end to the upper gripping element 21 and an operating handle member 32 mounted on the upper end of the operating shaft 22 with capacity for horizontal sliding movement.

The frame 17 is generally in the shape of a trapezoidal box open at the front and has a bottom 23, a back 24 extending vertically from the plane of the bottom 23, a top 25 extending parallel to the bottom 23 and two inclined sides 26 joining the bottom 23, top 25 and back 24. The frame 17 is conveniently formed by casting but of course could be formed by other methods known to the art such as separate sections welded together.

Figure 5:
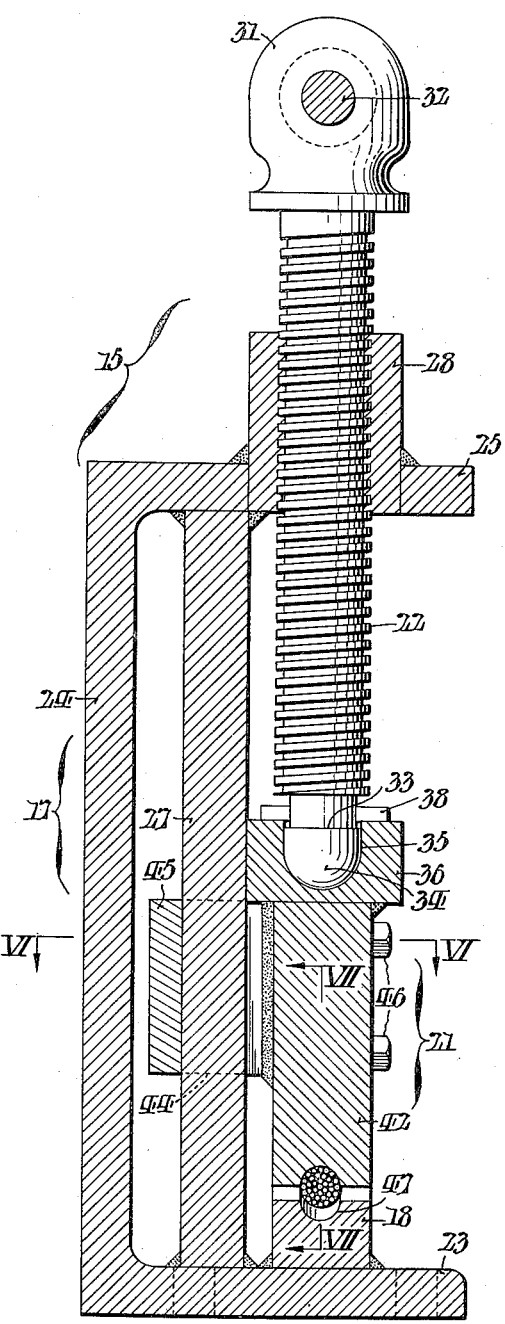
Fig. 5 is a vertical transverse section taken as indicated by the arrows V—V in Fig. 3.

Vertically positioned within the frame 17 is a guide bar 27 having a rectangular cross section and welded in place at its upper and lower ends to the bottom 23 and top 25 respectively as is clearly shown in Fig. 5. A collar 28 is vertically mounted by welding in an aperture formed in the top 25 to receive the collar 28. The inside of the collar 28 is threaded for engagement with the operating shaft 22 which extends therethrough.

The operating shaft 22 has an enlarged head portion 31 formed on the top thereof and having a hole formed therein to receive the handle member 32 which is of a conventional type. The handle 32 has capacity for sliding movement through the head 31 and is prevented from becoming disengaged therefrom by the enlarged or ball shaped ends 32a. By sliding the handle 32 to its extreme position with one of the ends 32a in contact with the enlarged head 31, a powerful leverage is obtained for operating the cable vise. The bottom end 34 of the operating shaft 22 is given the shape of a portion of a sphere having a peripheral shoulder 33 formed at the top thereof. A cavity 35 is formed in the top of element 36 of the upper gripping member 21 to receive the rounded end 34 of the operating shaft 22. The internal configuration of the cavity 35 is complementary to the external configuration of the rounded end 34 of the operating shaft 22. Two retaining plates 37 and 38 are mounted on the top of the element 36 by bolts 39. The inner ends of the retaining plates 37 and 38 are formed with complementary semi-circular configurations to extend around the operating shaft 22 above the peripheral shoulder 33 and in abutting relation therewith. This construction effectively connects the lower end 34 of the operating shaft 22 to the upper gripping element 21 with capacity for rotation.

The element 36 of the upper gripping element 21 is welded to the top of lower element 42 as shown in Fig. 5. The lower element 42 of the upper gripping element 21 is circular in shape with the top portion cut off to form a flat plane to which the upper element 36 is welded. A groove 43 is formed peripherally around element 42 except for the flat portion at the top thereof. This groove 43 is of a size convenient to receive the cable 13 and function as a guide therefor. Two guide blocks 44 are welded on the back of the element 42 in spaced relation to receive the guide bar 27 therebetween. A plate 45 is held in place over the ends of the guide blocks 44 and in sliding contact with the back of the guide bar 27 by means of bolts 46.

The lower gripping element 18 is mounted on the bottom 23 of the frame 17 beneath the upper gripping element 21 and in functional relation thereto. The top of the lower gripping element 18 is given a semi-circular configuration which is complementary to the circular configuration of the bottom edge of the upper gripping element 21. A groove 47 is formed in the top of the lower gripping element 18 which corresponds to the groove 42 forming around the bottom edge of the upper gripping element 21. The semi-circular configuration of the top of the lower gripping element 18 terminates at each end in snubbing shoulders 50 and 51 having spaced guiding projections 52 formed at the sides thereof. Mention should be made of the positioning of the edges 29 of the sides 26 with relation to the grooves 42 and 47. When the upper gripping element 21 is raised to receive the cable 13, the edges 29 aid in guiding the cable 13 into position to be seated in the groove 42 and between the guiding projections 52 as the vise is closed. See Fig. 4.

In the operation of this invention as described above there are two separate functions. The cable vise in its open position operates as a fair-lead as shown in Fig. 2. In this position the groove 43 in the upper gripping element 21 cooperates with the guiding projections 52 on the sides of the snubbing shoulders 50 and 51 to form a fair-lead through which the cable 13 is rove to the winch 16. In Figs. 1 and 7 cable vise 15 is in the closed or gripping position in which it functions as a vise to securely hold the cable 13 which in turn holds the reel 12 in place. With the cable 13 locked in the vise 15, the winch 16 can be slackened up to give the needed flexibility of movement between the trailer 10 and tractor 11 for maneuvering purposes. It is important to note that the gripping action of the vise 15 is more than a mere frictional gripping as is shown in prior art devices. As is shown in Figs. 3 and 7, the cable 13 is snubbed over the snubbing shoulders 50 and 51 by means of the upper gripping element 21 which extends down between the snubbing shoulders 50 and 51 bending the cable over these snubbing shoulders 50 and 51 and wedging the downwardly bent portions of the cable 13 against the inner edges of snubbing shoulders 50 and 51. This snubbing and wedging action effectively increases the holding power of the cable vise over the holding power of a similar vise depending entirely on frictional engagement.

While this invention has been described above in considerable detail and certain modifications thereof suggested, it will be apparent to those skilled in the art that various other changes and modifications may be made without departing from the spirit or scope of the invention as defined in the following claims.

I claim:

1. In combination with a trailer and a tractor having a winch mounted thereon, a cable vise mounted on said trailer rearwardly from said winch, said cable vise having gripping elements and one of said gripping elements being formed with a groove to receive said cable, and a cable having one end attached to the rear portion of said trailer and leading through said cable vise to said winch.

2. The invention of claim 1 characterized further by the fact that said cable vise has arcuate gripping elements.

3. The invention of claim 1 characterized further by the fact that said cable vise has one gripping element having two spaced snubbing shoulders and a second gripping element positioned between said shoulders and wedging the cable against said shoulders.

4. The invention of claim 3 characterized by the fact that said snubbing shoulders are formed to bend the portion of the rope being gripped away from the horizontal.

5. A cable vise adapted for use on a trailer or the like comprising a frame, a gripping element mounted on said frame, a threaded operating shaft mounted in threaded engagement with said frame, a second gripping element rotatably mounted on an end of said operating shaft, an arcuate guiding surface formed on one of said gripping elements and a snubbing shoulder formed on the other of said gripping elements over which a cable may be bent and snubbed in the gripping action.

6. The invention of claim 5 characterized further by the fact that said gripping elements are each formed with a groove therein to receive the cable subject to the gripping operation.

7. The invention of claim 5 characterized further by the fact that a vertical guide element is mounted in said frame and said second gripping element is connected to said guide element with capacity for vertical movement.

8. A cable vise adapted for use on a trailer or the like having a frame, a concave gripping element mounted on said frame and having a snubbing shoulder formed at each end thereof, a convex gripping element formed to function as a fair-lead and mounted on said frame with capacity for guided vertical movement above said concave gripping element, and an operating shaft in threaded engagement with said frame and rotatably connected at its lower end to said convex gripping element.

9. The invention of claim 8 characterized further by a handle member mounted on the upper end of said operating shaft.

10. In combination with a trailer and a tractor having a winch, a cable having one end attached to the trailer and leading to the said winch, and a cable vise formed to function as a fair-lead and mounted on the trailer, said vise having fixed and movable gripping elements, and a support for said gripping elements including upstanding walls disposed at one side of the path of said cable and serving to obstruct movement of the cable toward that side whereby as the winch takes up the slack and a downward pressure is exerted upon the cable it will be vertically guided to a position where it will enter between the gripping elements from the opposite side of the cable path.

11. The invention of claim 10 characterized further by the fact that the supporting frame for said gripping elements constitutes a box frame with an open side, and the gripping elements operate in the plane of said open side.

CLAUDE A. SCHEIRER.

REFERENCES CITED

The following references are of record in the file of this patent:

UNITED STATES PATENTS

| Number | Name | Date |
|---|---|---|
| 842,449 | Didrich | Jan. 29, 1907 |
| 897,903 | Kennedy | Sept. 8, 1908 |
| 966,604 | Russell | Aug. 9, 1910 |
| 1,346,152 | Amos et al. | July 13, 1920 |
| 1,554,937 | Wohlgemuth | Sept. 22, 1925 |
| 1,914,098 | Bean | June 13, 1933 |
| 2,318,802 | Reid | May 11, 1943 |
| 2,386,849 | Frankel | Oct. 16, 1945 |

FOREIGN PATENTS

| Number | Country | Date |
|---|---|---|
| 180,233 | Germany | Jan. 9, 1907 |
| 631,621 | Germany | June 24, 1936 |
| 130,300 | Austria | Nov. 10, 1932 |
| 100,094 | Switzerland | July 2, 1923 |